United States Patent [19]

Fung et al.

[11] 4,444,896
[45] Apr. 24, 1984

[54] REACTIVATION OF IRIDIUM-CONTAINING CATALYSTS BY HALIDE PRETREAT AND OXYGEN REDISPERSION

[75] Inventors: Shun C. Fung, Bridgewater; Walter S. Kmak, Scotch Plains, both of N.J.

[73] Assignee: Exxon Research and Engineering Co., Florham Park, N.J.

[21] Appl. No.: 374,977

[22] Filed: May 5, 1982

[51] Int. Cl.³ .................. B01J 23/96; B01J 23/46; B01J 23/64; C10G 35/085
[52] U.S. Cl. .................................... 502/37; 208/140; 502/35; 502/230
[58] Field of Search .................. 252/415, 441, 442; 208/140; 502/35, 36, 37, 230

[56] References Cited

U.S. PATENT DOCUMENTS

| | | | |
|---|---|---|---|
| 2,785,138 | 3/1957 | Milliken, Jr. | 252/415 |
| 3,622,520 | 11/1971 | Hayes | 252/415 |
| 3,625,860 | 12/1971 | Condrasky | 252/415 |
| 3,673,109 | 6/1972 | Georgescu et al. | 252/415 |
| 3,904,510 | 9/1975 | Sinfelt et al. | 208/140 |
| 3,937,600 | 2/1976 | Yates et al. | 208/140 |
| 3,939,061 | 2/1976 | Paynter et al. | 208/140 |
| 3,939,062 | 2/1976 | Sinfelt et al. | 208/140 |
| 3,941,682 | 3/1976 | Kmak et al. | 208/140 |
| 3,941,716 | 3/1976 | Paynter | 252/415 |
| 3,943,052 | 3/1976 | Kmak et al. | 208/140 |
| 3,981,823 | 9/1976 | Yates | 252/415 |
| 4,046,673 | 9/1977 | Paynter et al. | 208/140 |
| 4,159,938 | 7/1979 | Lewis | 208/139 |
| 4,172,817 | 10/1979 | Yates et al. | 208/140 |
| 4,359,400 | 11/1982 | Landolt et al. | 252/415 |

FOREIGN PATENT DOCUMENTS

| | | |
|---|---|---|
| 57551 | 11/1982 | European Pat. Off. . |
| 2257337 | 8/1975 | France . |
| 2290953 | 11/1975 | France . |
| 1484372 | 9/1977 | United Kingdom . |
| 1516518 | 7/1978 | United Kingdom . |

*Primary Examiner*—P. E. Konopka
*Attorney, Agent, or Firm*—Robert J. North

[57] ABSTRACT

A process is disclosed for reactivating an agglomerated iridium-containing catalyst and particularly a platinum-iridium on alumina reforming catalyst. The process includes contacting an agglomerated catalyst with a reducing gas such as hydrogen to reduce agglomerated iridium oxides to the free metal, a hydrogen chloride pretreatment step to increase the chloride level of the catalyst to about 1.6 weight percent and above, and a redispersion step involving contacting with elemental oxygen. The process eliminates the need for gaseous chlorine in the redispersion feedstream. If no iridium oxides are initially present, the hydrogen reduction step is optional.

22 Claims, No Drawings

REACTIVATION OF IRIDIUM-CONTAINING CATALYSTS BY HALIDE PRETREAT AND OXYGEN REDISPERSION

BACKGROUND OF THE INVENTION

This invention relates to a process for reactivating a partially or completely decoked agglomerated iridium-containing catalyst involving the sequential steps of reducing any agglomerated iridium oxides, if present on the catalyst surface, to the metal, pretreating the catalyst surface with a halide-providing compound in the absence of elemental oxygen, and redispersing the metallic iridium by contact with an atmosphere of elemental oxygen.

SUMMARY OF THE INVENTION

It has been found that iridium-containing catalysts can be efficiently redispersed and reactivated by the use of a hydrogen halide pretreatment coupled with an elemental oxygen redispersion step, both steps following decoking and reduction of the agglomerated metal oxides. The use of elemental oxygen eliminates the need for the use of direct elemental chlorine in the process and results in high redispersion values of iridium. Preferably, the oxygen treatment is conducted under slow flow rate conditions. The concentration of oxygen used is preferably about 0.05 to 100 volume percent in the atmosphere contacting the catalyst, preferably being air, and at temperatures in the range of about 450° to 600° C.

The halide pretreatment step is conducted with two limitations, (1) that about 1.6 weight percent halide and above, and preferably 1.7 to 2.5 weight percent halide, taken as the coke-free, dry catalyst, and most preferably saturated with halide under the conditions used, is present on the catalyst surface after the pretreatment and maintained at or above this level up to and during the subsequent oxygen redispersion step, and (2) that, during the halide pretreatment step, no elemental oxygen is present in the feedstream or is generated in situ. If this halide level is not maintained during subsequent redispersion and if elemental oxygen is present during the pretreatment, then substantially lower redispersion values will be obtained with concomitant decrease in catalyst metal surface area and activity.

The subject process is applicable to a wide variety of iridium-containing catalysts and particularly to reforming catalysts employing platinum-iridium on alumina, which are completely or partially decoked.

Generally, halide-providing compounds are used in the pretreatment step including organic halides and hydrogen halides with gaseous hydrogen chloride being the preferred hydrogen halide-providing compound use in the pretreatment and chloride levels of about 1.6 weight percent and above, on the catalyst surface are necessary to insure effective redispersion. The halide weight percent is expressed on the basis of dry, coke-free catalyst.

The pretreatment step is generally conducted in the temperature range of about 250° to 600° C., and the halide weight percentage can be monitored, for example, by X-ray fluorescence versus known standards. Generally, with the exception of very severely coked and agglomerated iridium-containing catalyst, the subject process is capable of producing substantially decoked, highly redispersed, iridium-containing catalyst in a one-cycle treatment.

In accordance with this invention, there is provided a process for reactivating agglomerated catalysts containing metallic iridium value comprising the steps of:

(a) pretreating said catalyst by contact with a substantially elemental oxygen-free atmosphere comprising a halide-generating compound at an elevated temperature to provide about 1.6 weight percent and above, halide to the catalyst, taken as the coke-free, dry catalyst; and (b) redispersing the metallic iridium from step (a) by contact at an elevated temperature with an atmosphere consisting essentially of elemental oxygen.

A further embodiment of the process is where the catalyst further initially contains iridium oxide which is contacted with a reducing atmosphere at elevated temperature to substantially convert said iridium oxide to metallic iridium prior to step (a).

DESCRIPTION OF THE INVENTION AND PREFERRED EMBODIMENTS

The novel process of the present invention includes the sequence of halide pretreatment/oxygen redispersion steps which enhances the potential of the process for monocycle reactivation/redispersion and eliminates the need, as practiced in the prior art, for rigorous, extended multi-cycle hydrogen/halogen treatment.

Catalysts which can be treated by the subject process include generally, iridium-containing catalysts, with and without co-catalysts, preferably being supported. Other metallic co-catalysts, which can be present with iridium, which are applicable in the process include metals such as, for example, platinum, rhodium, rhenium, palladium, mixtures thereof and the like. The metals can be present in bimetallic, trimetallic combinations and higher combinations as alloys, or physical mixtures, on the same support particles or where the metals are individually present on separate support particles. Preferred metal combinations in the catalyst for treatment by the subject process are platinum-iridium and platinum-iridium-rhenium The metals can be supported on a suitable support, which is conventional, with the proviso that the support is stable during the pretreatment process and does not undergo any deleterious reactions. Representative examples include silica, zeolites, alumina, silica-alumina, zirconia, alumina-zirconia, mixtures thereof and the like. In general, the active metallic components, if supported, are present in an amount of preferably up to about 10 weight percent of the supported catalysts.

A preferred catalyst which can be reactivated in the process is agglomerated platinum-iridium, preferably supported on alumina.

By the term, "agglomerated catalysts", as used herein, is meant a supported or unsupported catalyst containing metallic iridium singly, or in combination with other metals described herein, in the agglomerated state, sufficient to reduce the catalytic activity of the metal catalyst. The agglomerated metal, e.g., metallic iridium, can be present due to the result of oxygen burn-off of coke deposits producing agglomerated iridium oxide which then must be reduced to metallic iriridum by hydrogen gas. Also, hydrogen stripping at high temperature, preferably about 450° to 600° C., will result in partial removal of coke deposits and leave the agglomerated iridium in a metallic state. The metallic iridium in the agglomerated catalyst will undergo effective redispersion by the process described herein. Where the catalyst additionally contains iridium oxide, a hydrogen reducing step is necessary to convert the iridium oxide to metallic iridium prior to redispersion.

The agglomerated metallic iridium-containing catalysts operable in the process can be completely or partially decoked as described above by separate oxygen or hydrogen treat steps or not decoked at all, but simply removed from an on-stream process, e.g., reforming in the presence of hydrogen gas at elevated temperature and subjected to the described process herein.

Agglomerated, coked catalysts are usually industrially decoked by an oxygen burn-off of carbon deposits. Generally, a typical used catalyst from industrial operation may contain up to about 6 weight percent of carbon deposits and can be agglomerated after the decoking step up to about a 100 percent extent, as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates may be greater than about 50 Å and up to about 100 Å and greater in crystallite size. Decoking of the catalyst can be conducted under a variety of conditions but is generally conducted by heating in an atmosphere containing 0.01 to 10 volume percent $O_2$ at a temperature of about 400° to 550° C., to remove surface, embedded carbon deposits and particularly "active" carbon deposits. Generally, about 60 to 100 weight percent of carbon deposits can be removed in the decoking step. For example, U.S. Pat. No. 3,904,510 describes a typical procedure employed in decoking. The subject process is applicable to a wide range of decoked agglomerated catalysts containing varying amounts of remaining carbon deposits, different degrees of agglomeration, varying particle size ranges and varying impurities.

An optional first step in the subject process is wherein said partially or completely decoked agglomerated catalyst is treated with a reducing atmosphere, generally comprising hydrogen gas to reduce primarily metal oxides and oxide layers which may be present on agglomerated metallic iridium particles, formed during decoking, and as a further aid in removing residual active carbon deposits from the decoking step. If no metallic oxides are present, then the reduction step, as described herein, is not mandatory. However, if metallic oxides are present, the reduction step must be conducted in order to achieve high volumes of redispersion. Other reducing or inert gases may also be present, including nitrogen, helium and the like. The reducing step is generally conducted by contacting the catalyst at an elevated temperature generally in the range of about 250° to 600° C., preferably about 300° to 540° C. in a reducing atmosphere comprising above about one volume percent hydrogen gas or above, for a time to substantially reduce the metal oxides present to the free metals as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns as taken on the same catalysts used in reforming, from which coke has been burned in numerous cycles of use, generally show distinct metal lines which indicate highly agglomerated metal particles, of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas in a reducing atmosphere comprising essentially hydrogen, at a volume concentration of 0.05 to 5 volume percent and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75 to 100 percent and preferably about 90 to 100 percent. Generally, time requirements for the reduction will be in the range from about one to several hours depending on the process conditions. Shorter and longer times are also applicable.

Following the reduction step, if performed, the decoked-reduced catalyst is then subjected to halide pretreatment with a halide-providing compound. By the term "halide-providing compound" is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof and the like. When using haloorgano compounds, hydrogen in a large excess over the stoichiometric amount must also be used to convert the haloorgano compound to a hydrogen halide. The hydrogen halides can be hydrogen fluoride, hydrogen chloride, hydrogen bromide or hydrogen iodide. Preferably hydrogen chloride is the halide-providing compound used in the process. The atmosphere contacting the catalyst in this step can contain other inert gases, e.g., nitrogen and the like, and also including water vapor for more uniform distribution of halide on the catalyst surface prior to the halogenation treatment, and also preferably hydrogen gas or reducing gas in an amount of about 1–2 volume percent, to insure that the reduced catalyst remains in the reduced state during hydrogen halide pretreatment. It is essential that the atmosphere be substantially elemental oxygen-free during the halide pretreatment. Within this context, the halide feedstream should also preferably be elemental halogenfree since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen being present.

The temperature of the halide pretreatment is generally conducted in the range of about 250° to 600° C., and preferably about 300° to 540° C., and the halide providing compound, at the above-identified temperature, is contacted with the catalyst in a gaseous stream until about 1.6 weight percent and above halide is provided to the catalyst, as detected, for example, by X-ray fluorescence. Preferably, the catalyst is pretreated to a range of about 1.7 to 2.5 weight percent halide, or higher, and most preferably up to saturation by halide of the catalyst surface under the process conditions. As described hereinabove, the weight percentage of halide provided to the catalyst is taken as about 1.6 weight percent, said catalyst taken on a dry and coke-free basis. Where the catalyst has been extensively used in commercial processes having a lower surface area and catalytic activity as a result of this continued use, a minimum weight percentage of about one percent halide is reasonably believed to be effective in promoting high redispersion values in the subject process. For example, fresh catalysts having BET surface areas of 180 m$^2$/g and higher will require 1.6 weight percent halide and above. Used catalysts having surface areas of about 100 to 180 m$^2$/g will generally require a minimum of 1.3 to 1.6 weight percent and above halide prior to redispersion. However, an exact minimum value cannot be stated for a commercial spent catalyst due to large variances in surface area, coke deposits, impurities and poisons present, and the like. One skilled in the art, however, will be able to utilize this disclosure successfully for efficient redispersion. It is important that the halide content be maintained up to the halogen redispersion treatment. If a "purge" of hydrogen, nitrogen, water, mixtures thereof, or other materials is used subsequent to halide pretreatment, then such purge or contacting step should not reduce the halide level to below about 1.6 weight percent. If this happens, then the halide pretreatment should again be conducted to insure about 1.6 weight percent halide being present. This is particularly true in cases where multicycle treatment may be necessary in which the weight percent of halide present on the catalyst must be replenished again to about 1.6 weight percent and above, prior to each oxygen redispersion treatment.

The halide pretreatment is conducted for sufficient time to achieve a halide loading as described above. In practice, a fast flowing stream of preferably hydrogen chloride is contacted with the catalyst up to and slightly beyond breakthrough. By the term "breakthrough" is meant the first visible detection by an analytical method such as, for example, the color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients" which can lead to non-uniform redispersion. In general, water vapor present in the halide feedstream will tend to lower the halide loading slightly below that compared to a dry halide application, by approximately about 0.4 weight percent, but generally results in a more uniform halide distribution. Thus, saturation by dry HCl of a coke-free, dry catalyst will result in up to about a 2.8 weight percent halide loading, whereas saturation with a wet stream of HCl will result in up to about 2.4 weight percent, or even slightly lower, halide loading. Preferably, the HCl treatment is under dry conditions.

Time required for the halide pretreatment will, of course, be dependent on many factors, including flow rate, hydrogen halide gaseous concentrations, amount of catalyst and can be desirably adjusted, for example, to run for about 1 to 3 hours per catalyst regeneration in general. Concentration of hydrogen halide can be from 0.05 to about 5 volume percent, or higher, in the feedstream, which can be at a total pressure of about 0.1 to 2.0 MPa. Higher and lower values of both variables can also be used effectively.

Following the halide pretreatment step, the partially or completely decoked and reduced catalyst is then subjected to the redispersion process by contacting the catalyst with a gaseous stream consisting essentially of elemental oxygen.

The redispersion step is carried out at a temperature of about 450° to 600° C. and preferably about 500° to 540° C. At this temperature, the oxygen atmosphere is usually run at a slow flow rate over the surface of the catalyst at about a space velocity of up to about 11 v/v/hr., which will not reduce the catalyst halide level below about 1.6 weight percent of said catalyst. A preferred space velocity is in the range of about 2 to 8 v/v/hr. and, particularly preferred about 2 to 6 v/v/hr.

The oxygen redispersion can also be accomplished under static conditions wherein the oxygen gas is contacted with the catalyst in a closed catalyst container. Oxygen redispersion under static conditions, i.e. in a closed container, can be conducted by pressure-depressure cycles. After the halide pretreatment, the reactor is pressurized with diluted oxygen up to about 3.0 MPa and preferably about 1 to 2 MPa in the closed container. The pressure is then slowly decreased in about one-half hour, or longer, down to about one atmosphere and then pressurized back to 1 to 2 MPa. This cycle may be repeated several times.

The oxygen atmosphere may also contain inert gases as carrier gases but preferably is dry with no substantial amount of water vapor being present.

The concentration of elemental oxygen in the gaseous redispersion feedstream is from 0.05 to 100 volume percent, preferably 0.2 to 50 volume percent and most preferred being 4 to 21 volume percent. A particularly preferred gaseous stream for use in the redispersion is air.

The redispersion step is generally conducted until oxygen breakthrough occurs. Generally, this requires about 0.5 to 2 hours of oxygen treatment for used catalysts, which depends upon flow rate, oxygen concentration in the feedstream, and amount of catalyst. Generally, however, slightly longer times of oxygen treatment are required for substantially complete redispersion as evidenced by the absence of crystalline metal or metal oxide lines in the X-ray diffraction patterns. Preferably, at a time of about one to three hours past breakthrough is necessary for substantially complete redispersion.

By carrying out the process described herein, substantially complete redispersions of iridium-containing catalysts can be achieved and particularly those of platinum-iridium on alumina used in hydrocarbon reforming operations. The number of cycles necessary should generally be about one, however, in certain cases, such as where minimum oxygen treatment past breakthrough times are desired, multi-cycle treatment may prove necessary with concomitant need for additional pretreatment steps, as described hereinabove.

By the term "substantially complete redispersion" as used herein, is meant redispersion values, as determined by X-ray diffraction, of greater than about 55 numerical percent and preferably about 75 to 100 numerical percent of the iridium on the catalyst surface.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of halide to about 1.0 weight percent is carried out prior to reforming since excess halide, at this stage, leads to cracking of the liquid hydrocarbon fraction to undesirably smaller hydrocarbon fragments. The reduction can be accomplished by a wet hydrogen stream for example, which also serves to convert all of the metal species present after redispersion to the metallic state prior to use in a reforming process.

The following examples are illustrative of the best mode of carrying out the instant invention, as contemplated by the inventors, and should not be construed as being limitations on the scope or spirit of the instant invention.

EXAMPLE 1

A catalyst containing 0.3 weight percent iridium and 0.3 weight percent platinum, based on the total weight of the catalyst (BET surface area of 158 m$^2$/g) had been used in a reformer in the production of C$_5$+ gasoline. Several weight percent of coke deposit was found on the catalyst after the catalyst had been on stream for several months. The catalyst was regenerated stepwise in the reactor with dilute oxygen up to a flame front temperature of 496° C. The coke depleted catalyst suffered metal agglomeration and X-ray diffraction showed 80 percent of the total iridium as crystallites greater than 50 Å. There was about 0.11 weight percent of carbon left on the catalyst.

Sixty grams of this catalyst was charged into a quartz, tubular, horizontal reactor. The catalyst was divided into three approximately equal sections with a quartz wool plug as a spacer between the sections. The catalyst in Section 1 was at the entry of the reactor and the catalyst in Section 3 was at the reactor exit. The chloride level on this catalyst was determined to be 0.78 weight percent by X-ray fluorescence.

The catalyst was treated with a gaseous mixture of 20 percent hydrogen and 1.4 volume percent water in helium at one atmosphere for 2 hours at 524° C. The hydrogen was purged from the catalyst bed with helium. The catalyst was then treated with a gas mixture of 1.13 volume percent hydrogen chloride and 1.4 volume percent water in helium at 500 cc/min. After about 59 minutes, hydrogen chloride was detected at the reactor outlet. Hydrogen chloride treatment was continued for another 34 minutes. At this point, the hydrogen chloride concentration in the exit gas approached to that of hydrogen chloride in the inlet gas. Air at 4 cc/min. was introduced into the reactor and the flowstreams of hydrogen chloride, helium and water vapor were discontinued. The air treatment was continued for 3¼ hours. The results are shown in the Table.

In a related run, Example 1 was repeated substantially as described except that during the air treatment, the flow rate of air was increased to 100 cc/min. from 4 cc/min. The air treatment was continued for 5½ hours. The results are given in the Table as Example 1A. Chlorine was observed at the reactor outlet during the air treatment even though no chlorine was supplied to the reactor in both Examples 1 and 1A.

In Example 1A, the concentration of chlorine was 0.15 volume percent after it was air treated 16 minutes. Chlorine concentration decreased to 0.02 volume percent in 1½ hours. By contrast, chlorine concentration in Example 1 increased from 0.15 volume percent to 0.41 volume percent at the end of the air treatment. High air flow rate in Example 1A continuously removed chlorine from the reactor, and in turn, lowered the chloride level of the catalyst, whereas the low air flow rate in Example 1 minimized the purging of the reactive gases and conserved the catalyst chloride level. The catalyst chloride levels in Example 1A were lower than those of Example 1 by more than 0.2 weight percent.

In a further related run, Example 1 was repeated substantially as described except that the HCl treatment was discontinued after 30 minutes of treatment and before HCl was detected at the reactor outlet. The air treatment was continued for 7 hours. The results are shown in the Table as Example 1B.

This example indicates that the chloride level on the catalyst before the low flow oxygen treatment step is critical. The chloride levels after oxygen treatment do reflect the chloride levels of the catalyst at the end of the HCl treatment since during the low flow oxygen treatment, no significant concentrations of chlorine was detected at the reactor outlet.

As is indicated in the data, moderate metal redispersion was obtained when the catalyst chloride level was 1.2 weight percent and essentially no overall metal redispersion was realized when the catalyst chloride level was below 1 weight percent.

EXAMPLE 2

Example 1 was repeated substantially as described except that no water vapor was added in the hydrogen reduction step and the hydrogen chloride treat step. In the oxygen treat step, 10 percent oxygen in helium was used instead of air. The oxygen treatment was continued for 6.7 hours. The results are shown in the Table.

As is seen from comparing Example 2 with Example 1, complete metal redispersion was obtained when water was omitted in the treating gases and correspondingly, this resulted in an increase in catalyst chloride content of the treated catalyst.

EXAMPLE 3

The catalyst of Example 1 was treated substantially the same as in Example 2, except that during the oxygen treatment, 8 cc/min. gas flow rate was employed and the oxygen treatment time was about 2.3 hours. The results are shown in the Table.

It appears that though the oxygen flow rate was double, it still was sufficiently low that no significant loss of catalyst chloride occurred during the oxygen treatment and therefore excellent metal redispersion was realized.

EXAMPLE 4

A run was made using a fresh coke-free alumina catalyst containing 0.3 weight percent platinum and 0.3 weight percent iridium, based on the total weight of the catalyst (BET surface area of 200 m$^2$/g). The iridium component in this freshly prepared catalyst was completely agglomerated to large iridium particles by air calcined at 540° C. for 16 hours. Sixty grams of this catalyst were loaded into a reactor as described in Example 1. The catalyst was treated substantially the same as in Example 1 except that the air treatment was continued for 1.25 hours. The results are shown in the Table.

As is seen from the data, the present invention is highly effective in redispersing metal agglomerates present on fresh, coke-free and used catalysts from a reformer. However, the chloride level of the fresh, coke-free catalyst is higher than the latter by about 0.4 weight percent after the redispersion treatment. The lower chloride level on the used catalyst is mainly due to a reduction in the alumina surface area as a result of numerous cycles of on oil and coke burn regeneration.

EXAMPLE 5

The catalyst of Example 4 was treated substantially the same exactly as in Example 4, except that after the HCl treatment, a ten-minute dry helium purge was employed before the slow flow air treatment. The air treat step was continued for 4 hours. The results are shown in the Table.

This example indicates that even a short purging between the hydrogen chloride and the slow air flow treatment steps leads to a loss of catalyst chloride and a reduction in metal redispersion.

EXAMPLE 6

The catalyst of Example 4 was treated substantially the same as in Example 4 except that 2.6 volume percent water was employed in the hydrogen and hydrogen chloride treatment steps. The gaseous flow rate in the hydrogen chloride treatment was 660 cc/min. containing HCl in about 0.3 volume percent. The slow flow air treatment was continued about 2 hours. The results are shown in the Table below.

As is seen from contrasting Examples 4 and 6, an increase in $H_2O/HCl$ ratio from 1.24 to 8.67 greatly reduces metal redispersion and lowers the chloride level of the catalyst by about 0.4 weight percent.

EXAMPLE 7

The catalyst of Example 4 was treated substantially the same manner as in Example 4 except that about 0.3 to 0.4 volume percent water was employed in the hydrogen and the hydrogen chloride treatment steps. The gas flow rate in the hydrogen chloride treat was 773 cc/min. and HCl was present in 0.32 volume percent. The slow flow air treatment was continued for about 3 hours. The results are shown in the Table.

As is seen from contrasting Examples 6 and 7, by lowering the concentration of water to match that of hydrogen chloride, i.e., maintaining the $H_2O/HCl$ ratio at 1.25, excellent metal redispersion is obtained despite the low concentration of HCl. Additionally, the chloride level of the catalyst increases by about 0.3 weight percent.

EXAMPLE 8

The catalyst of Example 4 was treated substantially the same as in Example 4 except that in the slow flow air treatment, pure oxygen was used. The oxygen treatment was continued for 2.75 hours. The results are shown in the Table.

This example indicates oxygen concentration as high as 100 percent can be employed in the slow flow oxygen treatment step.

EXAMPLE 9

Six hundred and forty grams of the catalyst of Example 4 was charged into a high pressure reactor. The catalyst was treated with a gas mixture containing 0.3 volume percent water and about 50 percent hydrogen in nitrogen at 521° C. for about 2 hours. The reactor pressure was 65 psig. At the end of the hydrogen treatment, hydrogen concentration was reduced to 1.5 volume percent and 0.2 volume percent of HCl was added. This treatment was continued until the concentration of HCl at reactor outlet was about 90 percent of the inlet HCl concentration. Then hydrogen was shut off 15 minutes before the end of the HCl treatment. This reduced the hydrogen concentration in the reactor close to zero before the introduction of air. The reactor exit was blocked off and it was pressurized with dry air up to 205 psig. The catalyst was allowed to soak in the gas mixture for 3 hours. The results are shown in the Table.

In this example, the amount of oxygen per gram of catalyst introduced into the reactor was equivalent to that in Example 4. However, much lower metal redispersion was obtained when the air treatment was conducted under static conditions. This may be due to the build-up of water vapor in the reactor. Additionally, the

TABLE

| Example | % Ir Agglom. TI (a) | S-1 | S-2 | S-3 | % IrO₂ Agglom. S-1 | S-2 | S-3 | % Total Agglom. S-1 | S-2 | S-3 | % Redis. S-1 | S-2 | S-3 |
|---|---|---|---|---|---|---|---|---|---|---|---|---|---|
| 1 (b) | 80 | 8 | 8 | 0 | 0 | 0 | 0 | 8 | 8 | 0 | 90 | 90 | 100 |
| 1A (c) | 80 | 44 | 37 | 28 | 34 | 35 | 30 | 78 | 72 | 58 | 3 | 10 | 28 |
| 1B (d) | 80 | 17 | 18 | 46 | 5 | 26 | 41 | 22 | 44 | 87 | 73 | 45 | −9 (n) |
| 2 (e) | 80 | 0 | 0 | 0 | 0 | 0 | 0 | 0 | 0 | 0 | 100 | 100 | 100 |
| 3 (f) | 80 | 0 | 0 | 7 | 0 | 0 | 0 | 0 | 0 | 7 | 100 | 100 | 91 |
| 4 (g) | 100 | 0 | 0 | <5 | 0 | 0 | 0 | 0 | 0 | <5 | 100 | 100 | >95 |
| 5 (h) | 100 | 14 | 11 | 0 | 12 | 9 | 0 | 26 | 20 | 0 | 74 | 80 | 100 |
| 6 (i) | 100 | 13 | 14 | 22 | 57 | 69 | 49 | 70 | 83 | 71 | 30 | 27 | 29 |
| 7 (j) | 100 | 0 | 0 | 5 | 0 | 0 | 0 | 0 | 0 | 5 | 100 | 100 | 95 |
| 8 (k) | 100 | 0 | 0 | 0 | 0 | 0 | 0 | 0 | 0 | 0 | 100 | 100 | 100 |
| 9 (l) | 100 | 75 | 37 | 79 | 0 | 0 | 0 | 75 | 37 | 79 | 25 | 63 | 21 |
| 10 (m) | 47 | 16 | 13 | 13 | 0 | 0 | 0 | 16 | 13 | 13 | 66 | 72 | 72 |

(a) Total initial iridium agglomeration.
(b) % Cl: initial, 0.78; S-1, 1.44; S-2, 1.44; S-3, 1.45.
(c) % Cl: initial, 0.78; S-1, 1.16; S-2, 1.20; S-3, 1.25.
(d) % Cl: initial, 0.78; S-1, 1.28; S-2, 1.22; S-3, 0.97.
(e) % Cl: initial, 0.78; S-1, 1.63; S-2, 1.57; S-3, 1.59.
(f) % Cl: initial, 0.78; S-1, 1.73; S-2, 1.69; S-3, 1.70.
(g) % Cl: initial, 0.67; S-1, 1.85; S-2, 1.87; S-3, 1.86.
(h) % Cl: initial, 0.67; S-1, 1.73; S-2, 1.75; S-3, 1.74.
(i) % Cl: initial, 0.67; S-1, 1.51; S-2, 1.46; S-3, 1.44.
(j) % Cl: initial, 0.67; S-1, 1.80; S-2, 1.77; S-3, 1.73.
(k) % Cl: initial, 0.67; S-1, 1.77; S-2, 1.81; S-3, 1.82.
(l) % Cl: initial, 0.67; S-1, 1.53; S-2, 1.60; S-3, 1.57.
(m) % Cl: initial, 0.79; S-1, 1.46; S-2, 1.49; S-3, 1.52.
    % C: initial, 0.18; S-1, 0.09; S-2, 0.10; S-3, 0.07.
(n) Indicates some agglomeration occurred during the redispersion step.

catalyst chloride level in this example is lower than that of Example 4 by 0.3 weight percent.

A possible method to avoid buildup of water vapor is by oxygen pressure-depressure cycles. After the HCl pretreatment, the reactor may be pressurized with diluted oxygen (plus inert carrier) to a desired pressure, e.g. 100 psig. Then the pressure is slowly decreased to atmospheric pressure and then repressurized to about 100 psig (about 0.7 MPa). Repeating this cycle several times allows the oxygen to contact the catalyst to effect redispersion without a significant buildup of water vapor.

EXAMPLE 10

An alumina catalyst containing 0.3 weight percent iridium and 0.3 weight percent platinum, based on the total weight of the catalyst, had been used in a reformer in the production of $C_5^+$ gasoline. Several weight percent of coke deposit was found on the catalyst. The catalyst was regenerated in the reactor with dilute oxygen up to a flame front temperature of 480° C. Carbon content of the regenerated catalyst was 0.18 weight percent. Sixty grams of this catalyst was charged into the reactor and the reactivation procedure used was substantially the same as Example 1 except that the HCl concentration was 1.23 volume percent in the HCl treatment and the slow flow air treatment was 8.2 hours. The results are shown in the Table.

This Example indicates that the present invention can be applied to carbon-containing catalysts. Metal redispersion as well as coke burn-off can be effected during the oxygen redispersion step.

What is claimed is:

1. A process for reactivating an agglomerated catalyst containing metallic iridium comprising the steps of:
   (a) pretreating said catalyst by contacting with a substantially elemental oxygen-free atmosphere comprising a halide-providing compound at an elevated temperature to provide about 1.6 weight percent and above halide to the catalyst, taken as the coke-free, dry catalyst; and
   (b) redispersing the metallic iridium from step (a) while maintaining said 1.6 weight percent and above halide provided to the catalyst by contact with an atmosphere consisting essentially of elemental oxygen under static conditions or slow continuous flow conditions for a time sufficient to effect about 75 to 100 percent redispersion of said metallic iridium.

2. The process of claim 1 wherein said iridium value is initially present as agglomerated metallic iridium.

3. The process of claim 1 wherein said iridium-containing catalyst is present on a catalyst support selected from silica, zeolite, alumina, silica-alumina and mixtures thereof.

4. The process of claim 1 wherein said agglomerated catalyst further contains a metal co-catalyst selected from platinum, rhodium, rhenium, palladium and mixtures thereof.

5. The process of claim 1 wherein said halide-providing compound is one which generates a hydrogen halide in the presence of hydrogen gas.

6. The process of claim 5 wherein said halide-providing compound is selected from carbon tetrachloride, chloroform, methylene chloride, methyl chloride, 1,2-dichloroethane, hexachloroethane and mixtures thereof in the presence of hydrogen gas.

7. The process of claim 1 wherein said halide-providing compound is hydrogen chloride.

8. The process of claim 1 wherein said halide is present on the catalyst after step (a) in an amount of about 1.7 to 2.5 weight percent, taken as the coke-free, dry catalyst.

9. The process of claim 1 wherein said catalyst after completion of step (a) is saturated with halide.

10. The process of claim 1 wherein said catalyst is platinum-iridium supported on alumina.

11. The process of claim 1 wherein said catalyst is platinum-iridium-rhenium supported on alumina.

12. The process of claim 1 wherein the temperature in step (a) is in the range of about 250° to 600° C.

13. The process of claim 1 wherein said temperature in step (b) is in the range of about 450° to 600° C.

14. The process of claim 1 wherein contacting with elemental oxygen in step (b) is conducted substantially past breakthrough.

15. The process of claim 1 wherein said catalyst further contains iridium oxide which is contacted with a reducing atmosphere at elevated temperature to substantially convert said iridium oxide to metallic iridium prior to or concurrently with step (a).

16. The process of claim 15 wherein said reducing atmosphere comprises hydrogen gas.

17. The process of claim 15 wherein said temperature of said contacting with said reducing atmosphere is in the range of about 250°-600° C.

18. The process of claim 1 wherein said contacting by an elemental oxygen atmosphere is conducted by a stream of said atmosphere at a space velocity of up to about 11 v/v/hr.

19. The process of claim 18 wherein said space velocity is in the range of 2 to 8 v/v/hr.

20. The process of claim 1 wherein said contacting by an elemental oxygen atmosphere is conducted under static conditions at a pressure of about 0.1 to 3.0 MPa.

21. The process of claim 1 wherein said contacting by an elemental oxygen atmosphere is conducted in a cyclic fashion comprising the steps of subjecting said catalyst to said oxygen atmosphere at a pressure of about 1.0 to 3.0 MPa and then slowly decreasing said pressure to about one atmosphere.

22. A process for reactivating partially or completely decoked agglomerated platinum-iridium on alumina catalyst comprising the steps of:
   (a) contacting said agglomerated catalyst with a hydrogen atmosphere at a temperature in the range of about 300° to 540° C. and a pressure of about 0.1 to 2.0 MPa for a sufficient time to substantially reduce oxides of platinum and iridium to the respective metals;
   (b) contacting said catalyst from step (a) with a substantially elemental oxygen-free atmosphere comprising hydrogen chloride at a temperature in the range of about 300° to 540° C. and a pressure of about 0.1 to 2.0 MPa to saturate the catalyst with chloride; and
   (c) redispersing the metallic iridium and platinum while maintaining the catalyst chloride level at about 1.6 weight percent and above, by contact with an atmosphere consisting essentially of elemental oxygen at a temperature in the range of about 500° to 540° C. and a pressure of about 0.1–2 MPa and a space velocity of about 2 to 6 v/v/hr., for a sufficient time to effect about 76 to 100 percent redispersion of metallic platinum and iridium on the alumina.

* * * * *